United States Patent Office 3,247,266
Patented Apr. 19, 1966

3,247,266
1,1-DIHALOOLEFINS
Angelo John Speziale, Kirkwood, and Gino Joseph Marco, Webster Groves, Mo., assignors to Monsanto Company, a corporation of Delaware
No Drawing. Filed Feb. 12, 1962, Ser. No. 172,809
12 Claims. (Cl. 260—649)

This application is a continuation-in-part of copending application Serial No. 862,480, filed December 29, 1959, now abandoned.

This invention relates to a new and useful method of making 1,1-dihaloolefins, particularly, 1,1-dichloroolefins.

The principal purpose of this invention is to provide a novel method of synthesis by which a wide variety of 1,1-dihaloolefins can be prepared. A further purpose is to provide monomers for use in the preparation of a variety of useful halogen containing resinous substances by olefinic polymerization. Still further purposes are to provide biologically toxic substances and intermediates for the preparation of more active insecticides.

The method of this invention involves the preparation of 1,1-dihaloolefins of the formula

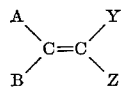

wherein Y is halogen of atomic weight in the range of 35 to 80 (i.e. chlorine or bromine, but usually chlorine), wherein Z is halogen of atomic weight in the range of 18 to 80 (i.e. fluorine, chlorine or bromine, but usually chlorine), and wherein A and B respectively are hydrogen or hydrocarbyl radicals free of acetylenic unsaturation or said hydrocarbyl radicals having substituents such as halogen, lower alkoxy, nitro, amino, mono-(lower alkyl)amino or di-(lower alkyl)amino by reacting in an inert organic liquid medium a compound of the formula

wherein A and B have the aforedescribed significance with a phosphinedihalomethylene of the formula

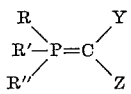

wherein Y and Z have the aforedescribed significance and wherein R, R' and R" are like or unlike aromatic hydrocarbon radicals containing 6 to 12 carbon atoms (e.g. phenyl, tolyl, ethylphenyl, cumyl, butylphenyl, hexylphenyl, xylyl, cymyl, biphenylyl, indenyl, naphthyl, and the various isomeric forms thereof) or said aromatic hydrocarbon radicals having substituents on the aromatic ring such as flourine, chlorine, bromine, lower alkoxy, nitro, amino($NH_2$), mono(lower alkyl)amino and di-(lower alkyl)amino. In general it is preferred that R, R' and R" be aromatic hydrocarbon radicals containing 6 to 12 carbon atoms, particularly phenyl ($C_6H_5$).

The phosphinedihalomethylene reactants of the method of this invention are prepared by reacting triaryl phosphine of the formula

wherein R, R' and R" have the aforedescribed significance with dihalocarbene of the formula

wherein Y and Z have the above significance.

Dihalocarbenes of the foregoing formula are well known materials and methods for their preparation are described in vol. 78, p. 4496, of the Journal of the American Chemical Society. They are also prepared in an anhydrous system by (1) Reacting an anhydrous alkaline reagent such as an alkali metal lower alkoxide with a haloform of the formula

wherein Y and Z have the aforedescribed significance, wherein X is halogen of atomic weight in the range of 35 to 80 (i.e. chlorine or bromine) but wherein X is not of lower atomic weight than Y.

(2) Heating of haloforms of the formula

wherein X, Y and Z are the same as in (1) above in the presence of phenyl lithium.

(3) Heating salts of a haloacetic acid of the formula

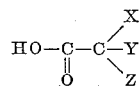

wherein X, Y and Z are the same as in (1) above.

(4) Heating esters of a haloacetic acid of the formula

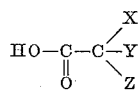

wherein X, Y and Z are the same as in (1) above in the presence of an alkali metal lower alkoxide.

The dihalocarbenes prepared by any of the above reactions, or other known methods, are unstable but when generated in situ and in the presence of a triaryl phosphine of the formula

wherein R, R' and R" have the aforedescribed significance, they react spontaneously to form the phosphinedihalomethylene reactants of this invention.

The triaryl phosphines useful in preparing the phosphinedihalomethylene reactants of this invention include triphenyl phosphine and the various tritolyl phosphines, trixylyl phosphines, tricumyl phosphines, tri(biphenylyl) phosphines, tri(hexylphenyl) phosphines, trinaphthyl phosphines, tri(chlorophenyl) phosphines, tri(fluorophenyl) phosphine, tri(bromophenyl) phosphines, tri-(methoxyphenyl) phosphines, tri(ethoxyphenyl) phosphines, tri(nitrophenyl) phosphines, tri(N,N-dimethylaminophenyl) phosphines, tri(N,N-diethylaminophenyl) phosphines, (phenyl)(dinaphthyl) phosphines, (naphthyl)(diphenyl) phosphines, (chlorophenyl)(diphenyl) phosphines, (methoxyphenyl)(diphenyl) phosphines, (chlorophenyl)(ditolyl) phosphines, etc., and like triaryl phosphines which satisfy the foregoing structural formula. The preferred triaryl phosphines for preparing reactants in the process of this invention are those of the foregoing structural fomula wherein R, R' and R" are like or unlike aromatic hydrocarbon radicals containing 6 to 12 carbon atoms, e.g. triphenyl phosphine, tri(1-naphthyl) phosphine, tri(4-methylphenyl) phosphine, tri(2-ethylphenyl) phosphine, tri(3,5-xylyl) phosphine, tri(isobutylphenyl) phosphine, tri(4-tert.-butylphosphine), tri(4-isohexyl) phosphine, tri(4-methylphenyl) phosphine, (1-naphthyl) (diphenyl) phosphine, (4-methylphenyl) (diphenyl) phosphine and (phenyl) (di-4-methylphenyl) phosphine.

The aforedescribed dihalocarbenes are generated in situ, and react immediately with the triaryl phosphine present to provide the phosphinedihalomethylene reactants of this invention. In that the phosphinedihalomethylene reactants of this invention are sensitive to moisture they are preferably prepared in an anhydrous inert organic liquid media. Suitable inert liquid media include pentane, hexane, heptane, cyclohexane, benzene, toluene, xylene, and like liquid hydrocarbons and also diethyl ether, diisopropyl ether, tetrahydrofuran, and the like. In general in preparing the phosphinedihalomethylenes the procedure will involve mixing the triaryl phosphine reactant with the inert anhydrous organic liquid and gradually adding thereto the halogen containing precursor of the appropriate dihalocarbene reactant. While a wide range of reaction temperatures can be employed provided the system is fluid (i.e. a reaction temperature above the freezing point of the system up to and including the boiling point of the system) the optimum temperature will be that required to generate the dihalocarbene. The preferred reaction temperature is that which produces a substantially quantitative yield of dihalocarbene from the halogen containing precursor therefor and which enables a rapid and substantially complete reaction of the dihalocarbene and the triaryl phosphine.

To illustrate the preparation of the phosphinedihalomethylene reactants of this invention is the following:

EXAMPLE A

To an ice-cooled (0–5° C.) reaction vessel containing 150 ml. of pentane, 26.2 grams of triphenyl phosphine and 11.2 grams of anhydrous potassium t-butoxide and while agitating is added 12 grams of chloroform over a period of thirty minutes. A yellow suspension results, the yellow solid dispersed therein is identified as triphenylphosphinedichloromethylene. Since this yellow solid reaction product is reactive with moisture it is preferably kept in suspension in the anhydrous inert organic liquid medium (pentane in this instance) and under a nitrogen atmosphere until used.

The yellow suspension of Example A can be readily concentrated by azeotropically distilling of the by-product t-butanol, the azeotrope in this instance being a t-butanol-pentane mixture.

EXAMPLE B

To an ice-cooled (0–5° C.) reaction vessel containing 100 ml. of n-heptane, 26.2 grams of triphenyl phosphine, and 18.6 grams of an anhydrous equimolecular mixture of potassium t-butoxide and t-butanol, and while agitating is added 25.3 grams of bromoform over a period of 60 minutes. A yellow suspension results, the yellow solid dispersed therein is identified as triphenylphosphinedibromomethylene. The t-butanol (both added and by-product) is then distilled off under vacuum as an azetrope with n-heptane. To protect triphenylphosphinedibromomethylene against the effects of moisture 150 ml. of n-heptane is mixed with the residue in the distilling flask.

EXAMPLE C

To an ice-cooled (0–5° C.) reaction vessel containing 100 ml. of n-heptane, 26.2 grams of triphenyl phosphine, and 18.6 grams of an anhydrous equimolecular mixture of potassium t-butoxide and t-butanol, and while agitating is added 10.3 grams of dichlorofluoromethane ($CHFCl_2$) over a period of 60 minutes. A yellow suspension results, the yellow solid dispersed therein is identified as triphenylphosphinechlorofluoromethylene.

EXAMPLE D

Employing the procedure of Example A but replacing chloroform with an equimolecular amount of dibromochloromethane ($CHClBr_2$) there is obtained triphenylphosphinebromochloromethylene.

EXAMPLE E

Employing the procedure of Example A but replacing chloroform with an equimolecular amount of bromodichloromethane there is obtained triphenylphosphinedichloromethylene.

The preparation of other operable phosphinedihalomethylenes is described in copending application Ser. No. 155,817, filed November 29, 1961, now U.S. Patent No. 3,095,454.

The

reactants of the process of this invention include formaldehyde and a wide variety of aldehydes and ketones, as for example acetaldehyde, propionaldehyde, butyraldehyde, valeraldehyde, heptaldehyde, lauraldehyde, stearaldehyde, acrolein, crotonaldehyde, olealdehyde, benzaldehyde, the various tolualdehydes, tert.-butylbenzaldehyde, napthaldehyde, phenylacetaldehyde, naphthylacetaldehyde, cyclohexylacetaldehyde, phenpropionaldehyde, cinnamaldehyde, biphenylylacetaldehyde, acetone, methyl ethyl ketone, diisopropyl ketone, laurone, palmitone, stearone, methyl heptadecyl ketone, methyl vinyl ketone, phorone, mesityl oxide, allyl ethyl ketone, undecenyl methyl ketone, heptadecenyl methyl ketone, acetophenone, isovalerophenone, lauroyl-benzene, stearoyl-benzene, oleyoyl-benzene, cyclohexanone, benzophenone, ditolyl phenone, dibenzyl ketone, di(tert.-butylphenyl) ketone, di(isoamylphenyl) ketone, dicyclohexyl ketone, methyl cyclohexyl ketone, and the like, and said aldehydes and said ketones and the like having substituents such as halogen, lower alkoxy, nitro, amion, mono-(lower alkyl)-amino and di-(lower alkyl)amino, exemplary of which are mono-, di- and tri-chloroacetaldehydes, mono-, di-, and tri-bromoacetaldehydes, iodacetaldehyde, fluoroacetaldehyde, ethoxy butyraldehyde, the various chlorobenzaldehydes, the various bromobenzaldehydes, the various iodobenzaldehydes, the various fluorobenzaldehydes, the various nitro benzaldehydes, the various lower alkoxy substituted benzaldehydes such as 4-ethoxybenzaldehyde, the various amino substituted benzaldehydes such as p-amino-, p-monoethylamino- and p-diethylamino-benzaldehydes, mono-chloroacetone, alpha-dichloroacetone, alphachloroacetophenone, 4-chloroacetophenone, 4-nitroacetophenone, 4-aminoaectophenone, 4-chlorobenzophenone, 4-nitrobenzophenone, and the like. In general A and B will be like or unlike hydrocarbyl radicals of from 1 to 11 carbon atoms and free of acetylenic unsaturation, but preferably aromatic hydrocarbon radicals of from 6 to 10 carbons atoms (e.g. phenyl, tolyl, xylyl, ethylphenyl, cumyl, tert.-butylphenyl, etc.).

As illustrative of the method of this invention but not limitative thereof is the following.

Example 1

To a suitable reaction vessel equipped with a thermometer and agitator is charged an ice-cooled mixture of 26.2 grams of triphenylphosphine, 26.2 grams of potassium tert.-butoxide and 250 ml. of heptane. While agitating this ice-cooled (about 0–5° C.) mixture there is added over a 30 minute period 12.0 grams of chloroform in 200 ml. of heptane. Upon completion of this addition the yellow suspension of triphenylphosphinedichloromethylene is vacuum distilled at 15–20° C. to remove the tert. butanol by-product. To this yellow suspension so concentrated and at room temperature is added 18.2 grams of benzophenone in 100 ml. of heptane. This reaction mixture is then heated at 40–50° C. for 30 minutes with agitation. The reaction is then heated up to 70° C. on a steam bath, cooled to room temperature, and then allowed to stand for two days at room temperature. The reaction mass is then filtered to remove triphenylphosphine oxide and the filter cake washed with two 100 ml. portions of heptane. The washings and original filtrate are combined and evaporated to dryness in vacuo. The yellow oily residue is then crystallized from aqueous ethanol to give solid 1,1-diphenyl-2,2-dichloroethylene (yield 59% by weight; M.P. 79–80° C.).

*Example II*

Employing the procedure of Example I but replacing chloroform with an equimolecular amount of bromoform there is obtained solid 1,1-diphenyl-2,2-dibromoethylene (M.P. 84–85° C.). In this instance the phosphinedihalomethylene reactant is triphenylphosphinedibromomethylene.

*Example III*

Employing the procedure of Example I but replacing chloroform with an equimolecular amount of dichlorofluoromethane (CHFCl$_2$) there is obtained solid 1,1-diphenyl-2-chloro-2-fluoroethylene (M.P. 42.0–42.5° C.). In this instance the phosphinedihalomethylene reactant is triphenylphosphinechlorofluoromethylene.

*Example IV*

Employing the procedure of Example I but replacing benzophenone with an equimolecular amount of benzaldehyde there is obtained 1-phenyl-2,2-dichloroethylene.

*Example V*

Employing the procedure of Example I but replacing benzophenone with an equimolecular amount of acetone there is obtained 1,1-dimethyl-2,2-dichloroethylene.

*Example VI*

Employing the procedure of Example I but replacing benzophenone with an equimolecular amount of acetophenone there is obtained 1-methyl-1-phenyl-2,2-dichloroethylene.

*Example VII*

Employing the procedure of Example I but replacing benzophenone with an equimolecular amount of 4,4'-dichlorobenzophenone there is obtained 1,1-di(4-chlorophenyl)-2,2-dichloroethylene.

*Example VIII*

Employing the procedure of Example I but replacing benzophenone with an equimolecular amount of 4-nitrobenzaldehyde there is obtained 1-(4-nitrophenyl)-2,2-dichloroethylene.

*Example IX*

Employing the procedure of Example I but replacing benzophenone with an equimolecular amount of lauraldehyde there is obtained 1-(n-undecyl)-2,2-dichloroethylene.

*Example X*

Employing the procedure of Example I but replacing benzophenone with an equimolecular amount of 4-dimethylaminobenzaldehyde there is obtained 1-(4-dimethylaminophenyl)-2,2-dichloroethylene.

*Example XI*

Employing the procedure of Example I but replacing benzophenone with an equimolecular amount of 3,4-dichlorobenzaldehyde there is obtained 1-(3,4-dichlorophenyl)-2,2-dichloroethylene.

*Example XII*

Employing the procedure of Example I but replacing benzophenone with an equimolecular amount of 2,6-dichlorobenzaldehyde there is obtained 1-(2,6-dichlorophenyl)-2,2-dichloroethylene.

*Example XIII*

Employing the procedure of Example I but replacing benzophenone with an equimolecular amount of cinnamaldehyde there is obtained 1-(cinnamenyl)-2,2-dichloroethylene.

*Example XIV*

Employing the procedure of Example I but replacing benzophenone with an equimolecular amount of stearaldehyde there is obtained 1-(n-heptadecyl)-2,2-dichloroethylene.

*Example XV*

Employing the procedure of Example I but replacing benzophenone with an equimolecular amount of stearoylbenzene there is obtained 1-(n-heptadecyl)-1-phenyl-2,2-dichloroethylene.

*Example XVI*

Employing the procedure of Example I but replacing benzophenone with an equimolecular amount of oleyoylnaphthalene-2 there is obtained 1-(n-heptadec-9-enyl)-1-(2-naphthyl)-2,2-dichloroethylene.

*Example XVII*

Employing the procedure of Example I but replacing benzophenone with an equimolecular amount of di(4-isoamylphenyl) ketone there is obtained 1,1-di(4-isoamylphenyl)-2,2-dichloroethylene.

*Example XVIII*

Employing the procedure of Example I but replacing benzophenone with an equimolecular amount of laurone there is obtained 1,1-di(n-undecyl)-2,2-dichloroethylene.

*Example XIX*

Employing the procedure of Example I but replacing benzophenone with an equimolecular amount of p-chloroacetophenone there is obtained 1-(4-chlorophenyl)-1-methyl-2,2-dichloroethylene.

*Example XX*

Employing the procedure of Example I but replacing benzophenone with an equimolecular amount of m-aminoacetophenone there is obtained 1-(3-aminophenyl)-1-methyl-2,2-dichloroethylene.

*Example XXI*

Employing the procedure of Example I but replacing benzophenone with an equimolecular amount of o-nitroacetophenone there is obtained 1-(2-nitrophenyl)-1-methyl-2,2-dichloroethylene.

*Example XXII*

Employing the procedure of Example I but replacing benzophenone with an equimolecular amount of 4,4'-dinitro-benzophenone there is obtained 1,1-di(4-nitrophenyl)-2,2-dichloroethylene.

*Example XXIII*

Employing the procedure of Example I but replacing benzophenone with an equimolecular amount of 4-nitro-2,5-dimethoxy-benzophenone there is obtained 1-(4-nitro-2,5-dimethoxyphenyl)-1-phenyl-2,2-dichloroethylene.

*Example XXIV*

Employing the procedure of Example I but replacing benzophenone with an equimolecular amount of monobromoacetone there is obtained 1-(bromomethyl)-1-methyl-2,2-dichloroethylene.

*Example XXV*

Employing the procedure of Example I but replacing benzophenone with an equimolecular amount of α,α'-dichloroacetone there is obtained 1,1-di(chloromethyl)-2,2-dichloroethylene.

Example XXVI

Employing the procedure of Example I but replacing benzophenone with an equimolecular amount of methyl allyl ketone there is obtained 1-allyl-1-methyl-2,2-dichloroethylene.

Example XXVII

Employing the procedure of Example I but replacing triphenylphosphine with an equimolecular amount of tri(1-naphthyl)phosphine there is obtained 1,1-diphenyl-2,2-dichloroethylene, the phosphinedichloromethylene reactant here being tri(1-naphthyl)phosphinedichloromethylene.

Example XXVIII

Employing the procedure of Example I but replacing triphenylphosphine with an equimolecular amount of tri-(4-methylphenyl)phosphine there is obtained 1,1-diphenyl-2,2-dichloroethylene, the phosphinedichloromethylene reactant here being tri-(4 - methylphenyl)-phosphinedichloromethylene.

Example XXIX

Employing the procedure of Example I but replacing triphenylphosphine with an equimolecular amount of tri-(4-chlorophenyl)phosphine there is obtained 1,1-diphenyl-2,2-dichloroethylene, the phosphinedichloromethylene reactant here being tri(4-chlorophenyl)phosphinedichloromethylene.

Example XXX

Employing the procedure of Example I but replacing phosphine with an equimolecular amount of tri(4-isohexylphenyl)phosphine there is obtained 1,1-diphenyl-2,2-dichloroethylene, the phosphinedichloromethylene reactant here being tri-(isohexylphenyl)phosphinedichloromethylene.

Example XXXI

Employing the procedure of Example I but replacing benzophenone with an equimolecular amount of di(4-tolyl) ketone there is obtained 1,1-di(4-tolyl)-2,2-dichloroethylene.

Example XXXII

Employing the procedure of Example I but replacing benzophenone with an equimolecular amount of di(3,5-xylyl) ketone there is obtained 1,1-di(3,5-xylyl)-2,2-dichloroethylene.

Example XXXIII

Employing the procedure of Example I but replacing benzophenone with an equimolecular amount of di(4-tert.-butylphenyl) ketone there is obtained 1,1-di(4-tert.-butylphenyl)-1,1-dichloroethylene.

Example XXXIV

Employing the procedure of Example I but replacing benzophenone with an equimolecular amount of methyl vinyl ketone there is obtained 1-methyl-1-(vinyl)-2,2-dichloroethylene.

Example XXXV

To a suitable reaction vessel equipped with a thermometer and agitator is charged 26.2 grams of triphenylphosphine, 26.2 grams of potassium tert.-butoxide and 200 ml. of heptane. While agitating this mixture at room temperature is added 19.1 grams of ethyl trichloroacetate and 100 ml. of heptane. Upon completion of this addition the mass is heated to reflux and then refluxed for 30 minutes and cooled to room temperature. Thereafter and at room temperature is added to this suspension of triphenylphosphinedichloromethylene 18.2 grams of benzophenone in 150 ml. of heptane. The reaction mixture is then heated at 50–55° C. for 30 minutes with agitation, cooled to room temperature and allowed to stand for 24 hours. The mass is then filtered and the filtrate evaporated to dryness. The residue of the filtrate upon recrystallization from aqueous ethanol gives solid 1,1-diphenyl-2,2-dichloroethylene.

Example XXXVI

Employing the procedure of Example XXXV but replacing potassium tert.-butoxide with an equimolecular amount of phenyl lithium and replacing ethyl trichloroacetate with an equimolecular amount of chloroform there is obtained 1,1-diphenyl-2,2-dichloroethylene.

Example XXXVII

To a suitable reaction vessel equipped with a thermometer and agitator is charged a suspension of 36.8 grams of triphenylphosphinedichloromethylene in 200 ml. of pentane. While agitating and maintaining the temperature at 0–5° C. there is added over a 30 minute period 18 grams of benzophenone in 50 grams of diethyl ether. A nitrogen atmosphere is maintained in the reaction vessel at all times. Upon completion of the benzophenone addition the mass is agitated for 16 hours, filtered, and the filtrate evaporated to dryness. The residue of the filtrate is then taken up with a 50–50 benzene-hexane mixture, and the mass filtered. The collected filtrate is evaporated to dryness and the residue recrystallized from aqueous ethanol. The solid product is 1,1-diphenyl-2,2-dichloroethylene.

As aforementioned the method of this invention is conducted in an inert organic medium. The phosphinedihalomethylene reactants of the method of this invention regardless of their method of preparation are sensitive to moisture and are therefore prepared and stored in an inert anhydrous organic liquid medium. Accordingly, it is desirable to conduct the method of this invention in the organic liquid anhydrous medium in which the phosphinedihalomethylene reactant was prepared and/or stored. If there is some reason why it is desired to conduct the new reaction in a particular organic liquid, it may be feasible to prepare the phosphinedihalomethylene in that particular liquid, or to transfer the phosphinedihalomethylene to the said particular liquid subsequent to its synthesis for storage or use.

Suitable inert organic liquids for the reaction medium are the cycloaliphatic hydrocarbons such as cyclohexane, cyclopentane, and the aliphatic hydrocarbons, such as hexane, pentane, heptane, petroleum ether, gasoline or other petroleum fractions of narrow boiling point range. The liquid medium which must be inert serves to prevent contact of the reactants with the atmosphere, particularly with water vapor. Further protection can be had by sweeping the reaction mixture with nitrogen or other inert gas, or by maintaining a nitrogen or other inert gaseous atmosphere within a closed reaction vessel.

Because of the high reactivity of the phosphinedihalomethylene reactant and the resulting reaction product, low temperatures are usually desirable for both the preparation and the separation of the product 1,1-dihaloolefin from the reaction mixture. Reaction temperatures which permit a fluid system (i.e. a temperature above the freezing point of the system) up to about 20° C. are preferred. It is to be understood however that temperatures up to about 75° C. can be employed. Ordinarily the method of this invention will be conducted at atmospheric pressure, however, pressures above or below atmospheric pressure can be used. In general equimolecular proportions of the respective reactants will be employed however up to a 100% molar excess of the

reactant can be used where and when desired.

What is claimed is:

1. The method of making 1,1-dihaloolefins of the formula

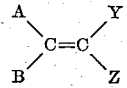

wherein Y is halogen of atomic weight in the range of 35 to 80, wherein Z is halogen of atomic weight in the range of 18 to 80, wherein A and B are selected from the group consisting of hydrogen, hydrocarbyl radicals free of acetylenic unsaturation and containing 1 to 17 carbon atoms and said hydrocarbyl radicals having substituents selected from the group consisting of halogen, lower alkoxy, nitro, amino, mono(lower alkyl)amino and di-(lower alkyl)amino which comprises reacting in an inert liquid organic medium a compound of the formula

wherein A and B have the aforedescribed significance with a phosphinedihalomethylene of the formula

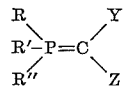

wherein Y and Z have the aforedescribed significance and wherein R, R′ and R″ are selected from the group consisting of aromatic hydrocarbon radicals containing 6 to 12 carbon atoms and said aromatic hydrocarbon radicals having substituents in the aromatic ring selected from the group consisting of fluorine, chlorine, bromine, lower alkoxy, nitro, amino, mono(lower alkyl)amino, and di-(lower alkyl)amino.

2. The method of making 1,1-dihaloolefins of the formula

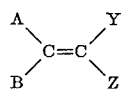

wherein Y is halogen of atomic weight in the range of 35 to 80, wherein Z is halogen of atomic weight in the range of 18 to 80, wherein A and B are selected from the group consisting of hydrogen, hydrocarbyl radicals free of acetylenic unsaturation and containing 1 to 17 carbon atoms and said hydrocarbyl radicals having substituents selected from the group consisting of halogen, lower alkoxy, nitro, amino, mono(lower alkyl)amino and di-(lower alkyl)amino which comprises reacting in an inert liquid organic medium a compound of the formula

wherein A and B have the aforedescribed significance with a phosphinedihalomethylene of the formula

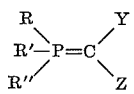

wherein Y and Z have the aforedescribed significance and wherein R, R′ and R″ are aromatic hydrocarbon radicals containing 6 to 12 carbon atoms.

3. The method of making 1,1-dihaloolefins of the formula

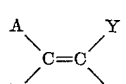

wherein Y is halogen of atomic weight in the range of 35 to 80, wherein Z is halogen of atomic weight in the range of 18 to 80, wherein A and B are selected from the group consisting of hydrogen, hydrocarbyl radicals free of acetylenic unsaturation and containing 1 to 17 carbon atoms and said hydrocarbyl radicals having substituents selected from the group consisting of halogen, lower alkoxy, nitro, amino, mono(lower alkyl)amino and di-(lower alkyl)amino which comprises reacting in an inert liquid organic medium a compound of the formula

wherein A and B have the aforedescribed significance with a triphenylphosphinedihalomethylene of the formula

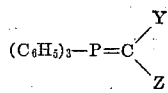

wherein Y and Z have the aforedescribed significance.

4. The process of claim 3 wherein Y and Z are chlorine.

5. The method of making 1,1-dichloroolefins of the formula

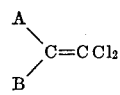

wherein A and B are hydrocarbyl radicals containing 1 to 11 carbon atoms and free of acetylenic unsaturation which comprises reacting in an inert aliphatic liquid hydrocarbon medium a ketone of the formula

wherein A and B are hydrocarbyl radicals containing 1 a phosphinedichloromethylene of the formula

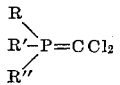

wherein R, R′ and R″ are aromatic hydrocarbon radicals containing 6 to 12 carbon atoms.

6. The method of making 1,1-dichloroolefins of the formula $$A-CH=CCl_2$$

wherein A is hydrocarbyl radical containing 1 to 11 carbon atoms and free of acetylenic unsaturation which comprises reacting in an inert aliphatic liquid hydrocarbon medium an aldehyde of the formula

wherein A has the aforedescribed significance with a phosphinedichloromethylene of the formula

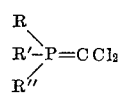

wherein R, R′ and R″ are aromatic hydrocarbon radicals containing 6 to 12 carbon atoms.

7. The method of claim 5 wherein A and B are aromatic hydrocarbon radicals containing 6 to 10 carbon atoms.

8. The method of claim 5 wherein R, R′ and R″ are phenyl.

9. The method of making 1,1 - dichloroolefins of the formula

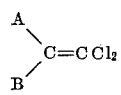

wherein A and B are aromatic hydrocarbon radicals containing 6 to 10 carbon atoms which comprises reacting in an inert aliphatic liquid hydrocarbon medium a ketone of the formula

wherein A and B have the aforedescribed significance with triphenylphosphinedichloromethylene.

10. The method of making 1,1-diphenyl-2,2-dichloroethylene which comprises reacting in an inert aliphatic liquid hydrocarbon medium benzophenone with triphenylphosphinedichloromethylene.

11. The method of claim 6 wherein R, R' and R" are phenyl.

12. The method of making 1-phenyl-2,2-dichloroethylene which comprises reacting in an inert aliphatic liquid hydrocarbon medium benzaldehyde with triphenylphosphinedichloromethylene.

References Cited by the Examiner

UNITED STATES PATENTS

| | | | |
|---|---|---|---|
| 2,879,303 | 3/1959 | Isler et al. | 260—606.5 |
| 2,879,304 | 3/1959 | Isler et al. | 260—606.5 |
| 2,930,814 | 3/1960 | Ramirez | 260—606.5 |
| 2,945,885 | 7/1960 | Surmatis | 260—606.5 |
| 2,998,416 | 8/1961 | Mendel | 260—606.5 |
| 3,095,455 | 6/1963 | Marco et al. | |
| 3,139,377 | 6/1964 | Ratts | 260—651 X |

LEON ZITVER, *Primary Examiner.*